J. F. NEALL.
VALVES FOR HYDRANTS.
No. 195,636. Patented Sept. 25, 1877.
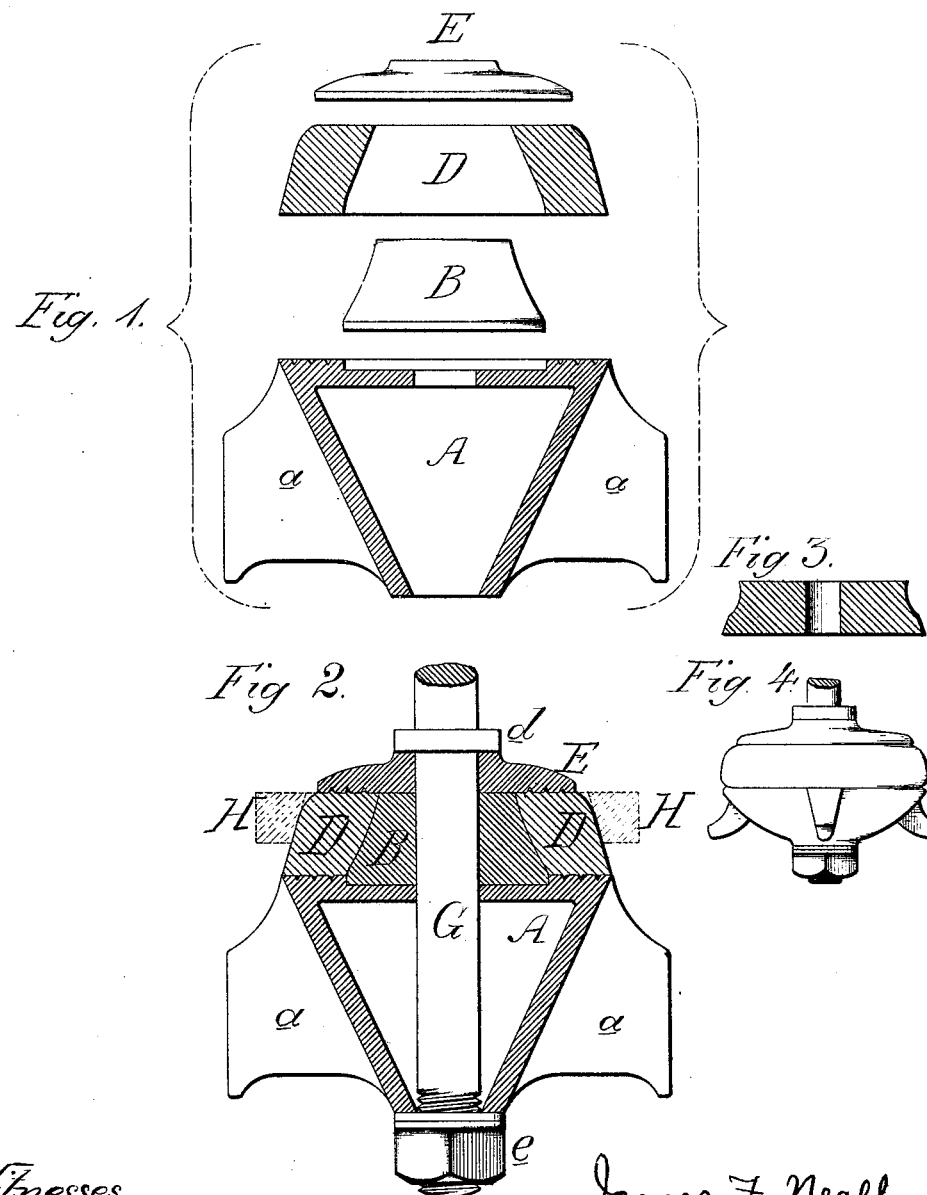

UNITED STATES PATENT OFFICE.

JAMES F. NEALL, OF PHILADELPHIA, PENNSYLVANIA.

IMPROVEMENT IN VALVES FOR HYDRANTS.

Specification forming part of Letters Patent No. 195,636, dated September 25, 1877; application filed August 11, 1877.

*To all whom it may concern:*

Be it known that I, JAMES F. NEALL, of Philadelphia, Pennsylvania, have invented a new and useful Improvement in Valves for Hydrants, &c., of which the following is a specification:

My invention relates to the construction of that class of valves for hydrants, &c., in which the part of the valve for bearing against the seat is composed of rubber or other elastic material; and the object of my invention is to confine the elastic material snugly to its place without subjecting it to such pressure as to deprive it of proper elasticity.

In the accompanying drawing, Figure 1 represents, in section, the several parts of the valve detached from each other; and Fig. 2, a section of the valve, showing the parts connected together.

The valve is composed of five main parts—namely, the metal body A, the core B, elastic ring D, washer E, and the valve-rod G—by which the several parts are connected together.

The body A of the valve is made, in the present instance, in the form of a hollow frustum of a cone, with guiding wings $a\ a$, adapted to the bore of the hydrant-barrel or other object to which the valve can be applied. In the top of the body A is a recess for receiving the lower ends of the metal core B, which is made of the tapering form represented in the drawing.

The elastic ring D is arranged to fit over the core and to bear on the body A, and is confined thereto by the washer E and the rod G, the latter having a collar, $d$, to bear on the washer E, and a nut, $e$, to bear against the under side of the body A.

The outer edge of the rubber ring is that part of the valve which has to bear against the seat H, (represented by dotted lines in Fig. 2,) and in order that the rubber may fit snugly to the seat without the exercise of undue effort in raising the valve, it is essential that the rubber should be of a yielding and elastic character, which it loses when subjected to great pressure.

As an explanation of this I may refer to the plan of making a rubber disk or ring of the shape shown in Fig. 3, and then, with the view of making a perfectly tight joint and securing the parts together, compressing the ring between a washer and the body of the valve until the ring is expanded and assumes the form shown in Fig. 4, so as to be adapted to the seat. By this compression the rubber necessarily loses the elasticity, to retain which is the object of my invention.

The elastic ring D is made, in the first instance, of the proper diameter and shape to suit the valve, and the central opening is of such a size and shape that, by a comparatively slight pressure, it can be fitted so snugly to the core as to insure a perfectly tight joint.

The rubber ring D is slightly thicker than the distance between the washer and body of the valve, so that in securing the parts together the ring is but slightly compressed when the metal parts of the valve are in contact with each other, but sufficiently to insure a tight fit over the conical core without imparting that rigidity to the outer edge of the ring which must be the result of the pressure exerted in the example illustrated in Figs. 3 and 4. The conical core, through which the tight joint is mainly effected without subjecting the ring D to great pressure, may form a part of the body A of the valve.

Another advantage of my invention results from the contact of the metal parts of the valve with each other, for a much more substantial and permanent valve is thus obtained than when rubber alone intervenes between the washer and body of the valve.

I claim as my invention—

The body A of the valve, the cone B, and washer E, all being in metallic contact with each other, in combination with the elastic ring D, confined between the said body A and washer E, all as set forth.

In testimony whereof I have signed my name to this specification in the presence of two subscribing witnesses.

JAS. F. NEALL.

Witnesses:
HERMANN MOESSNER,
HARRY SMITH.